(12) United States Patent
Melvin et al.

(10) Patent No.: US 10,495,753 B2
(45) Date of Patent: Dec. 3, 2019

(54) VIDEO TO RADAR

(71) Applicant: NEC Laboratories America, Inc., Princeton, NJ (US)

(72) Inventors: Iain Melvin, Hopewell, NJ (US); Eric Cosatto, Red Bank, NJ (US); Igor Durdanovic, Lawrenceville, NJ (US); Hans Peter Graf, Lincroft, NJ (US)

(73) Assignee: NEC Corporation (JP)

( * ) Notice: Subject to any disclaimer, the term of this patent is extended or adjusted under 35 U.S.C. 154(b) by 288 days.

(21) Appl. No.: 15/689,656

(22) Filed: Aug. 29, 2017

(65) Prior Publication Data
US 2018/0081053 A1 Mar. 22, 2018

Related U.S. Application Data

(60) Provisional application No. 62/396,280, filed on Sep. 19, 2016.

(51) Int. Cl.
*G01S 13/93* (2006.01)
*G06N 3/08* (2006.01)
(Continued)

(52) U.S. Cl.
CPC ............ *G01S 13/931* (2013.01); *B60Q 9/008* (2013.01); *B60R 1/00* (2013.01); *B60W 30/09* (2013.01); *G01S 7/20* (2013.01); *G01S 7/2955* (2013.01); *G01S 7/417* (2013.01); *G01S 13/867* (2013.01); *G01S 17/936* (2013.01); *G06K 9/00805* (2013.01); *G06K 9/46* (2013.01); *G06K 9/6215* (2013.01); *G06K 9/6232* (2013.01); *G06N 3/08* (2013.01); *B60G 2400/823* (2013.01);
(Continued)

(58) Field of Classification Search
CPC combination set(s) only.
See application file for complete search history.

(56) References Cited

U.S. PATENT DOCUMENTS 7,565,006 B2 * 7/2009 Stam ..................... B60Q 1/085
315/82
8,488,877 B1 * 7/2013 Owechko ........... G06K 9/00704
382/103
(Continued)

OTHER PUBLICATIONS

Eigen, et al., "Depth Map Prediction from a Single Image using a Multi-Scale Deep Network", Dept. of Computer Science, Courant Institute, New York University, Jun. 2014, pp. 1-9.
(Continued)

*Primary Examiner* — Tsung Yin Tsai
(74) *Attorney, Agent, or Firm* — Joseph Kolodka (57) ABSTRACT

A computer-implemented method and system are provided. The system includes an image capture device configured to capture image data relative to an ambient environment of a user. The system further includes a processor configured to detect and localize objects, in a real-world map space, from the image data using a trainable object localization Convolutional Neural Network (CNN). The CNN is trained to detect and localize the objects from image and radar pairs that include the image data and radar data for different scenes of a natural environment. The processor is further configured to perform a user-perceptible action responsive to a detection and a localization of an object in an intended path of the user.

17 Claims, 10 Drawing Sheets

(51) Int. Cl.
  *G06K 9/46* (2006.01)
  *G01S 17/93* (2006.01)
  *B60Q 9/00* (2006.01)
  *G01S 7/20* (2006.01)
  *G01S 7/295* (2006.01)
  *G01S 7/41* (2006.01)
  *G01S 13/86* (2006.01)
  *B60R 1/00* (2006.01)
  *B60W 30/09* (2012.01)
  *G06K 9/00* (2006.01)
  *G06K 9/62* (2006.01)

(52) U.S. Cl.
  CPC . *B60R 2300/301* (2013.01); *B60R 2300/8093* (2013.01); *B60W 2420/42* (2013.01); *B60W 2420/52* (2013.01); *G01S 2013/936* (2013.01); *G01S 2013/9367* (2013.01); *G01S 2013/9375* (2013.01)

(56) References Cited

U.S. PATENT DOCUMENTS

| | | | |
|---|---|---|---|
| 9,760,806 B1* | 9/2017 | Ning | B60W 50/14 |
| 10,373,019 B2* | 8/2019 | Nariyambut Murali | |
| 2014/0285667 A1* | 9/2014 | Aimura | G08G 1/166 348/148 |
| 2016/0140424 A1* | 5/2016 | Wang | G06K 9/66 382/156 |
| 2016/0355181 A1* | 12/2016 | Morales Teraoka | B60W 30/14 |
| 2017/0154241 A1* | 6/2017 | Shambik | B60R 1/00 |
| 2017/0200063 A1* | 7/2017 | Nariyambut Murali | G06K 9/4628 |
| 2018/0082137 A1* | 3/2018 | Melvin | G01S 13/931 |

OTHER PUBLICATIONS

Garg, et al., "Unsupervised CNN for Single View Depth Estimation: Geometry to the Rescue", arXiv:1603.04992v2, Jul. 2016, pp. 1-16.
Li et al., "Vehicle Detection from 3D Lidar Using Fully Convolutional Network", arXiv:1608.07916, Aug. 2016, 8 pages.
Liu et al., "Deep Convolutional Neural Fields for Depth Estimation from a Single Image", CPVR 2015, Oct. 2015, pp. 5162-5170.
Xiang, et al., "Data-Driven 3D Voxel Patterns for Object Category Recognition", IEEE, Jun. 2015, pp. 1903-1911.
Zhou, etal., "Image-based Vehicle Analysis using Deep Neural Network: A Systematic Study", arXiv:1601.01145v2 cs. CV, Aug. 2016, 5 pages.

* cited by examiner

VIDEO TO RADAR

RELATED APPLICATION INFORMATION

This application claims priority to U.S. Provisional Pat. App. Ser. No. 62/396,280, filed on Sep. 19, 2016, incorporated herein by reference herein its entirety. This application is related to an application entitled "Advanced Driver-Assistance System", and which is incorporated by reference herein in its entirety.

BACKGROUND

Technical Field

The present invention relates to Advanced Driver-Assistance Systems (ADAS) and more particularly to ADAS involving video to radar.

Description of the Related Art

Advanced Driver-Assistance Systems (ADAS) are designed to help a car driver by recognizing dangerous situations from the configuration of cars, bicycles, pedestrians, and other objects surrounding the driving car. A key step is to obtain the relative positions and velocities of these surrounding objects from various sensors and create a top-view map representation of the surrounding driving scene. However, current ADAS are not without deficiency. Accordingly, there is a need for an improved approach for ADAS.

SUMMARY

According to an aspect of the present invention, a system is provided. The system includes an image capture device configured to capture image data relative to an ambient environment of a user. The system further includes a processor configured to detect and localize objects, in a real-world map space, from the image data using a trainable object localization Convolutional Neural Network (CNN). The CNN is trained to detect and localize the objects from image and radar pairs that include the image data and radar data for different scenes of a natural environment. The processor is further configured to perform a user-perceptible action responsive to a detection and a localization of an object in an intended path of the user.

According to another aspect of the present invention, a computer-implemented method is provided. The method includes capturing, by an image capture device, image data relative to an ambient environment of a user. The method further includes detecting and localizing, by a processor, objects, in a real-world map space, from the image data using a trainable object localization Convolutional Neural Network (CNN). The method also includes providing, by the processor, performing a user-perceptible action responsive to a detection and a localization of an object in an intended path of the user. The CNN is trained to detect and localize the objects from image and radar pairs that include the image data and radar data for different scenes of a natural environment.

According to yet another aspect of the present invention, a computer program product is provided. The computer program product includes a non-transitory computer readable storage medium having program instructions embodied therewith. The program instructions are executable by a computer to cause the computer to perform a method. The method includes capturing, by an image capture device, image data relative to an ambient environment of a user. The method further includes detecting and localizing, by a processor, objects, in a real-world map space, from the image data using a trainable object localization Convolutional Neural Network (CNN). The method also includes providing, by the processor, performing a user-perceptible action responsive to a detection and a localization of an object in an intended path of the user. The CNN is trained to detect and localize the objects from image and radar pairs that include the image data and radar data for different scenes of a natural environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to Advanced Driver-Assistance Systems (ADAS) involving video to radar.

In an embodiment, the present invention provides a trained Convolutional Neural Network (CNN) model (hereinafter interchangeably referred to as "CNN" in short) able to output such a top-view map representation of the surrounding driving scene directly from a monocular video input stream.

In an embodiment, the present invention provides a system having a "trainable object localization convolutional neural network" which enables the simultaneous detection and localization in a "2-dimensional map view" of one or multiple objects from a camera image (or series of images). The system is trained using pairs of: (a) a camera image, or series of video images; and (b) a list of objects and their real world positions acquired from some other source (e.g., radar). Hence, while the CNN model is trained using data pairs such as image data and radar data pair, the CNN model performs detection using solely image data, so as to exploit the correlated data used for training. For example, while an embodiment may use only image data (and possible velocity data) for detection, the detection will exploit correlations in the training data between the image data and the radar data so as to essentially use radar data (from training) during the detection so as to involve multiple information sources.

In an embodiment, the present invention predicts the positions of the objects in "real world x,y map space" and not in the space of the input image as per the prior art. The complete system simultaneously solves object detection, depth estimation and projection into real world coordinates, thus overcoming at least one significant deficiency of the prior art. It is to be appreciated that other advantages/features of the present invention over the prior art are described in further detail herein below.

In an embodiment, the present invention can be enabled by one or more of the following three ideas: (1) transformation of positional labelled data to the internal geometry of a CNN architecture; (2) the use of internal CNN layers as "depth" layers; and (3) the use of a MAX function to vertically collapse the internal layers of the CNN into the map view.

Figure 1:
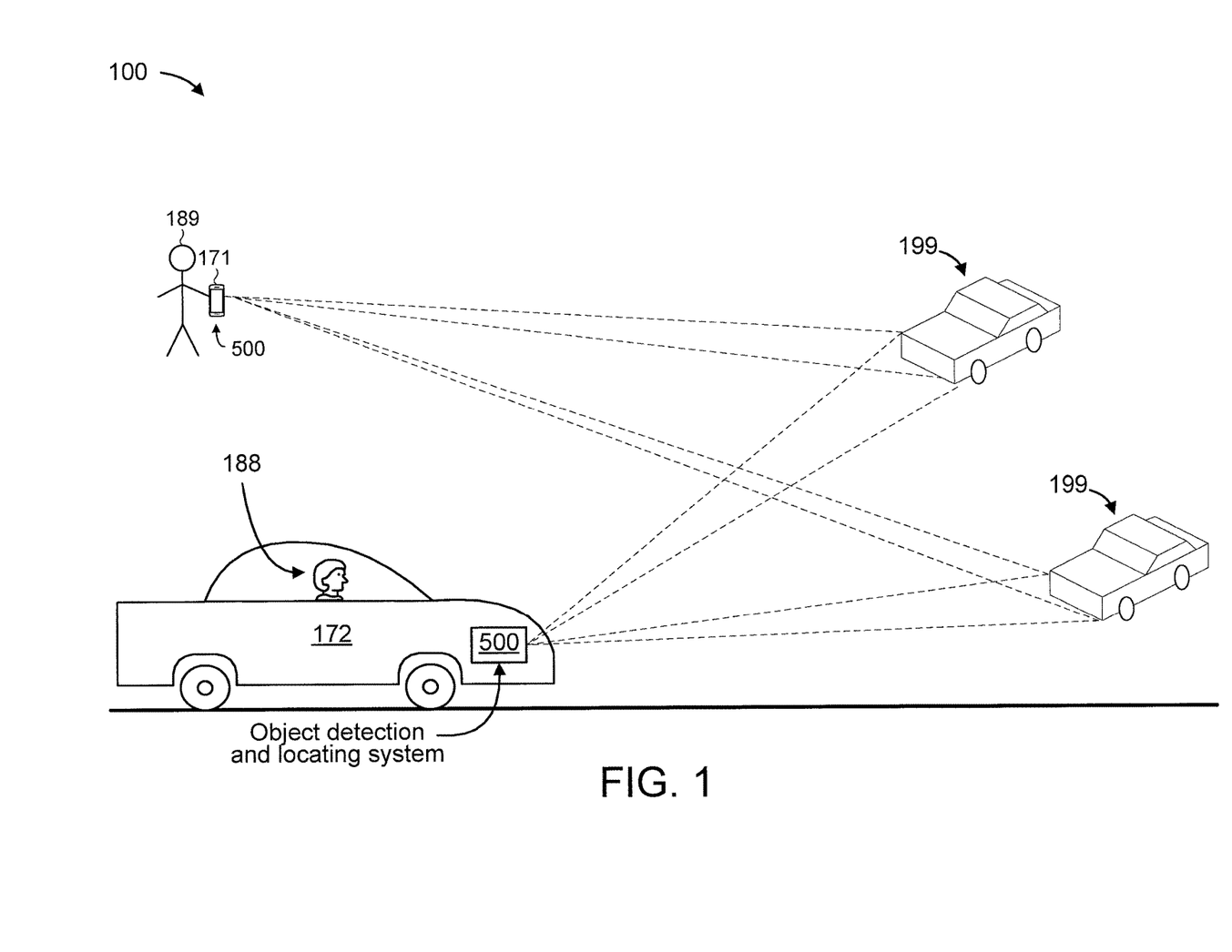
FIG. 1 shows the present invention in an exemplary environment to which the present invention can be applied, in accordance with an embodiment of the present invention.

FIG. 1 shows the present invention in an exemplary environment 100 to which the present invention can be applied, in accordance with an embodiment of the present invention.

Figure 2:
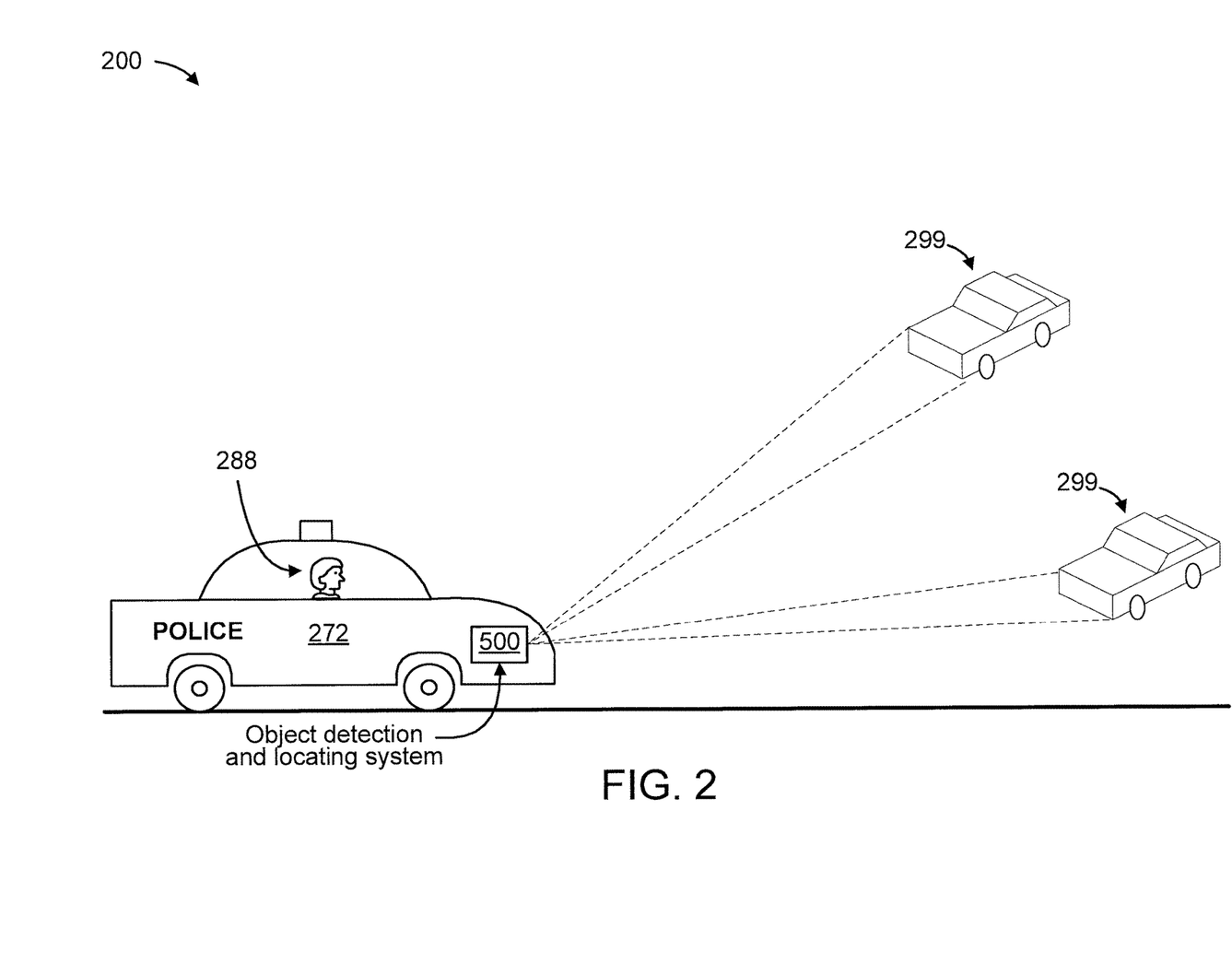
FIG. 2 shows the present invention in another exemplary environment to which the present invention can be applied, in accordance with an embodiment of the present invention.
Figure 3:
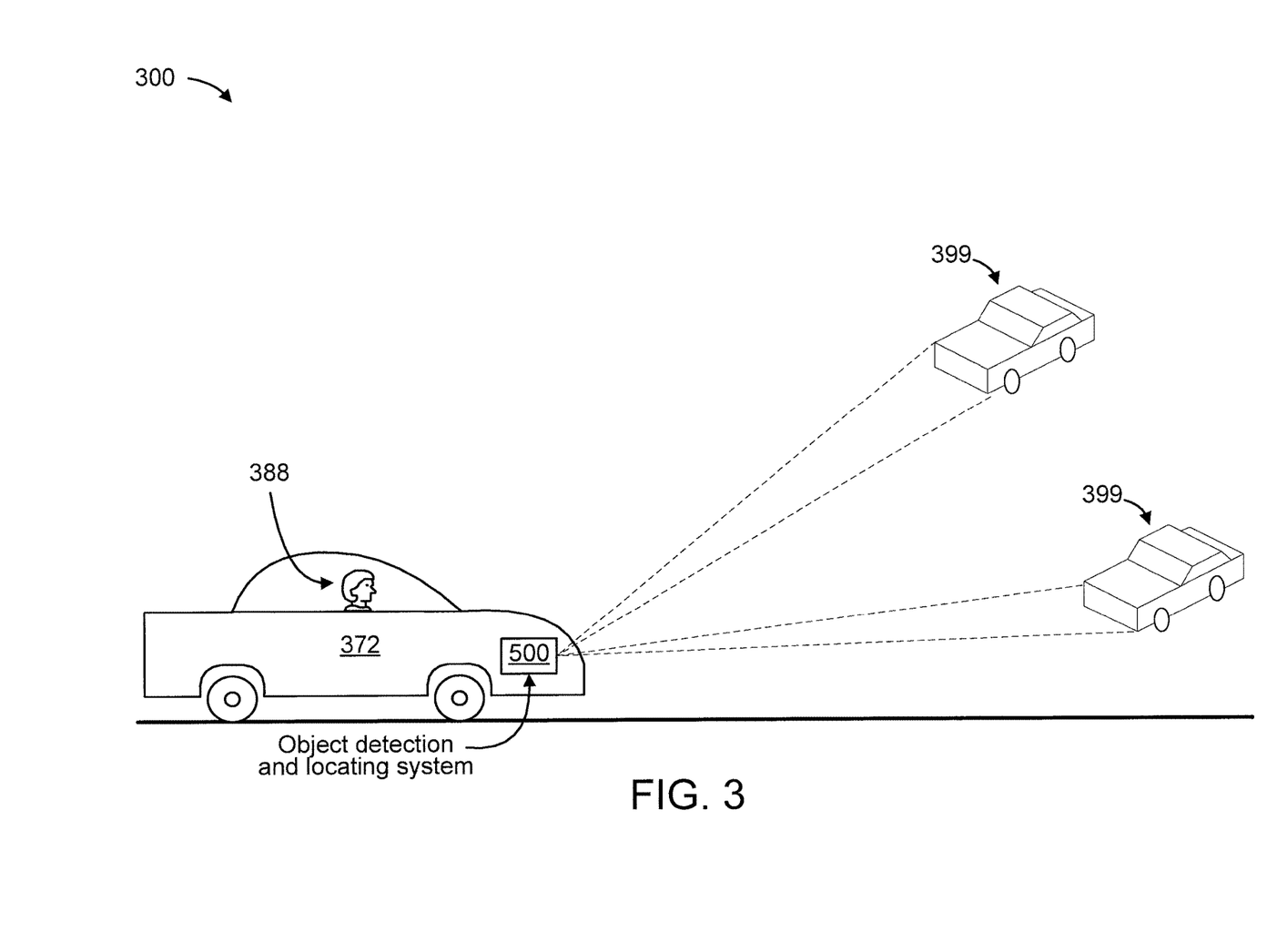
FIG. 3 shows the present invention in yet another exemplary environment to which the present invention can be applied, in accordance with an embodiment of the present invention.

In the environment 100, a user 188 is located in a scene with multiple objects 199, each having their own locations and trajectories. The user 188 may or may not be in a vehicle. For the sake of illustration, user 188 is shown walking in the scene, while another user 189 is shown within a vehicle. In the case of user 188, the system of the present invention (e.g., system 500) may interface with the user through a smart phone 171 or other device of the user. In the case of user 189, the system of the present invention (e.g., system 500) may interface with the user through a vehicle 172 that the user is operating. Environments 200 and 300 described hereinafter with respect to FIGS. 2 and 3 are specifically directed to embodiments where the user is operating an emergency vehicle and a non-emergency vehicle, respectively.

Figure 5:
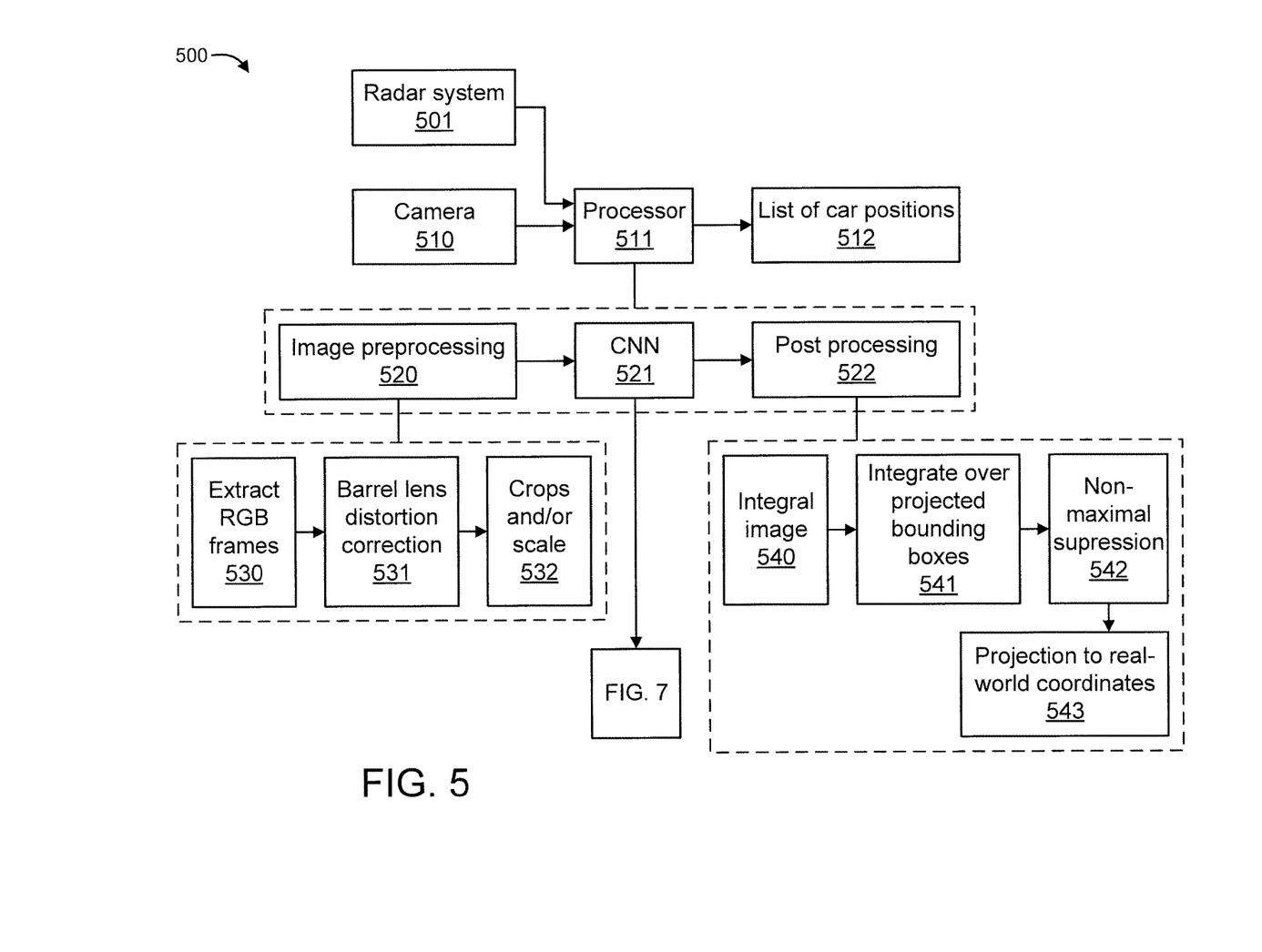
FIG. 5 shows an exemplary system for object tracking, in accordance with an embodiment of the present invention.

The system of the present invention, such as system 500 shown and described with respect to FIG. 5, can interface with the user in order to be made aware of any objects in the user's trajectory. That is, in an embodiment, the user can be provided with a list of objects and their respective locations (e.g., through smart phone 171 and/or vehicle 172). The list of objects can be provided visually, audibly, and/or so forth. In this way, the user can navigate around these objects 199 to avoid potential collisions there between.

Hence for applications such as computer vision for the vision impaired, or any other object detection and location determining application, the present invention can detect and locate objects such as poles, garbage cans, vehicles, persons, and so forth in the path of a user (or, e.g., in the path of an object (e.g., vehicle) in which the user is traveling). As is readily appreciated by one of ordinary skill in the art, detection results will likely be more accurate for larger objects to be detected.

As an example use case directed to user 188, such user may be texting and walking without being cognizant of their surroundings. Often, people have walked into bodies of water or other objects while being distracted while walking and performing another function such as, but not limited to, texting. The present invention can provide an audible alert to indicate to the user 188 that an object is in their path so that they can avoid colliding with the object. These and other use cases of the present invention are readily determined by one of ordinary skill in the art, while maintaining the spirit of the present invention.

FIG. 2 shows the present invention in another exemplary environment 200 to which the present invention can be applied, in accordance with an embodiment of the present invention.

In the environment 200, a user 288 is located in a scene with multiple objects 299, each having their own locations and trajectories. The user 288 is operating an emergency vehicle 272 (e.g., an ambulance, a police car, a fire truck, and so forth). In the example of FIG. 2, the emergency vehicle 272 is a police car.

The system of the present invention (e.g., system 500) may interface with the user through one or more systems of the emergency vehicle 272 that the user is operating. For example, the system of the present invention can provide the user information through a system 272A (e.g., a display system, a speaker system, and/or some other system) of the emergency vehicle 272. Moreover, the system of the present invention (e.g., system 500) may interface with the emergency vehicle 272 itself (e.g., through one or more systems of the emergency vehicle 272 including, but not limited to, a steering system, a braking system, an acceleration system, a steering system, etc.) in order to control the vehicle or cause the emergency vehicle 272 to perform one or more actions. In this way, the user or the emergency vehicle 272 itself can navigate around these objects 299 to avoid potential collisions there between.

FIG. 3 shows the present invention in yet another exemplary environment 300 to which the present invention can be applied, in accordance with an embodiment of the present invention.

In the environment 300, a user 388 is located in a scene with multiple objects 399, each having their own locations and trajectories. The user 388 is operating a non-emergency vehicle 372 (e.g., a car, a truck, a motorcycle, etc., that is not operated specifically for emergencies).

The system of the present invention (e.g., system 500) may interface with the user through one or more systems of the non-emergency vehicle 372 that the user is operating. For example, the system of the present invention can provide the user information through a system 372A (e.g., a display system, a speaker system, and/or some other system) of the non-emergency vehicle 372. Moreover, the system of the present invention (e.g., system 500) may interface with the non-emergency vehicle 372 itself (e.g., through one or more systems of the non-emergency vehicle 372 including, but not limited to, a steering system, a braking system, an acceleration system, a steering system, etc.) in order to control the vehicle or cause the non-emergency vehicle 372 to perform one or more actions. In this way, the user or the non-emergency vehicle 372 itself can navigate around these objects 399 to avoid potential collisions there between.

Figure 4:
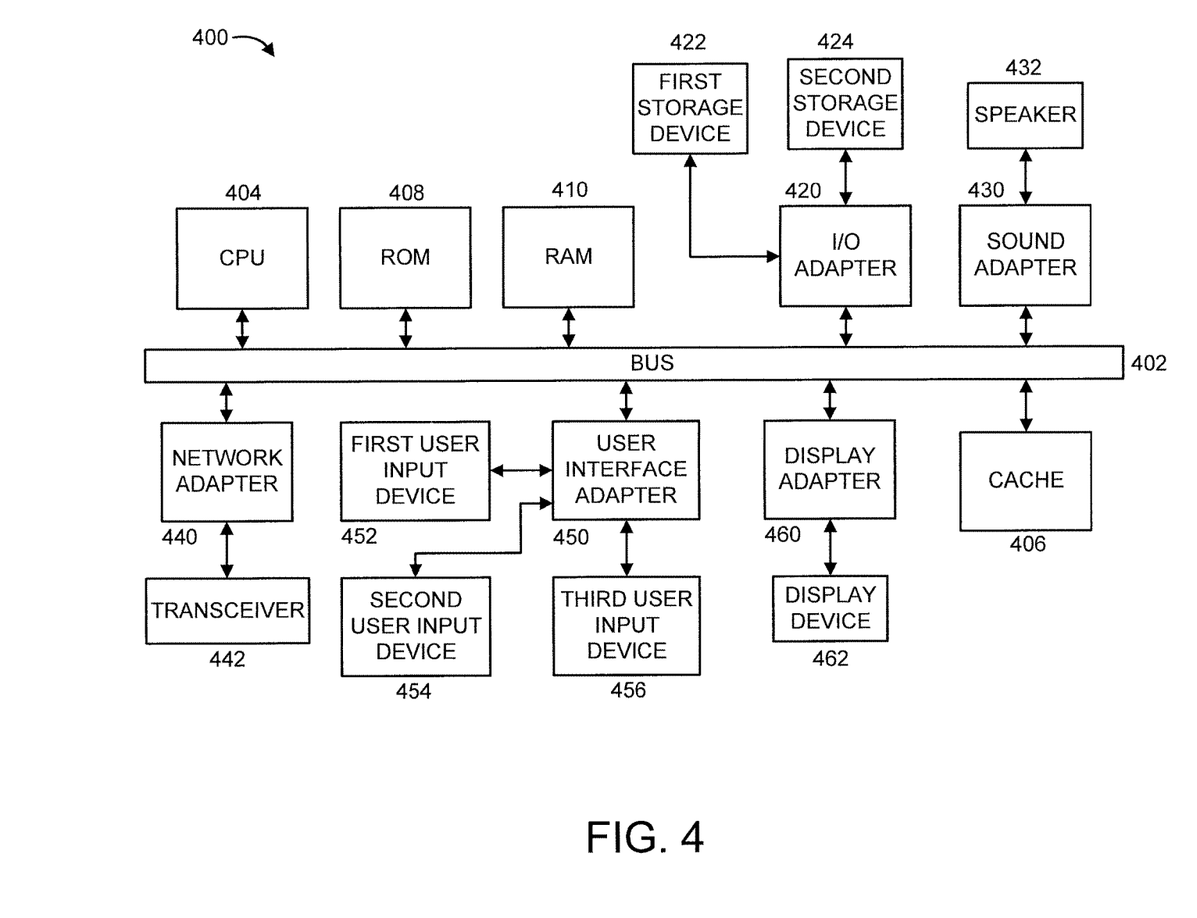
FIG. 4 shows an exemplary processing system to which the present principles may be applied, in accordance with an embodiment of the present principles.

FIG. 4 shows an exemplary processing system 400 to which the present principles may be applied, in accordance with an embodiment of the present principles. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that system 500 described above with respect to FIG. 5 is a system for implementing respective embodiments of the present principles. Part or all of processing system 400 may be implemented in one or more of the elements of system 500.

Figure 6:
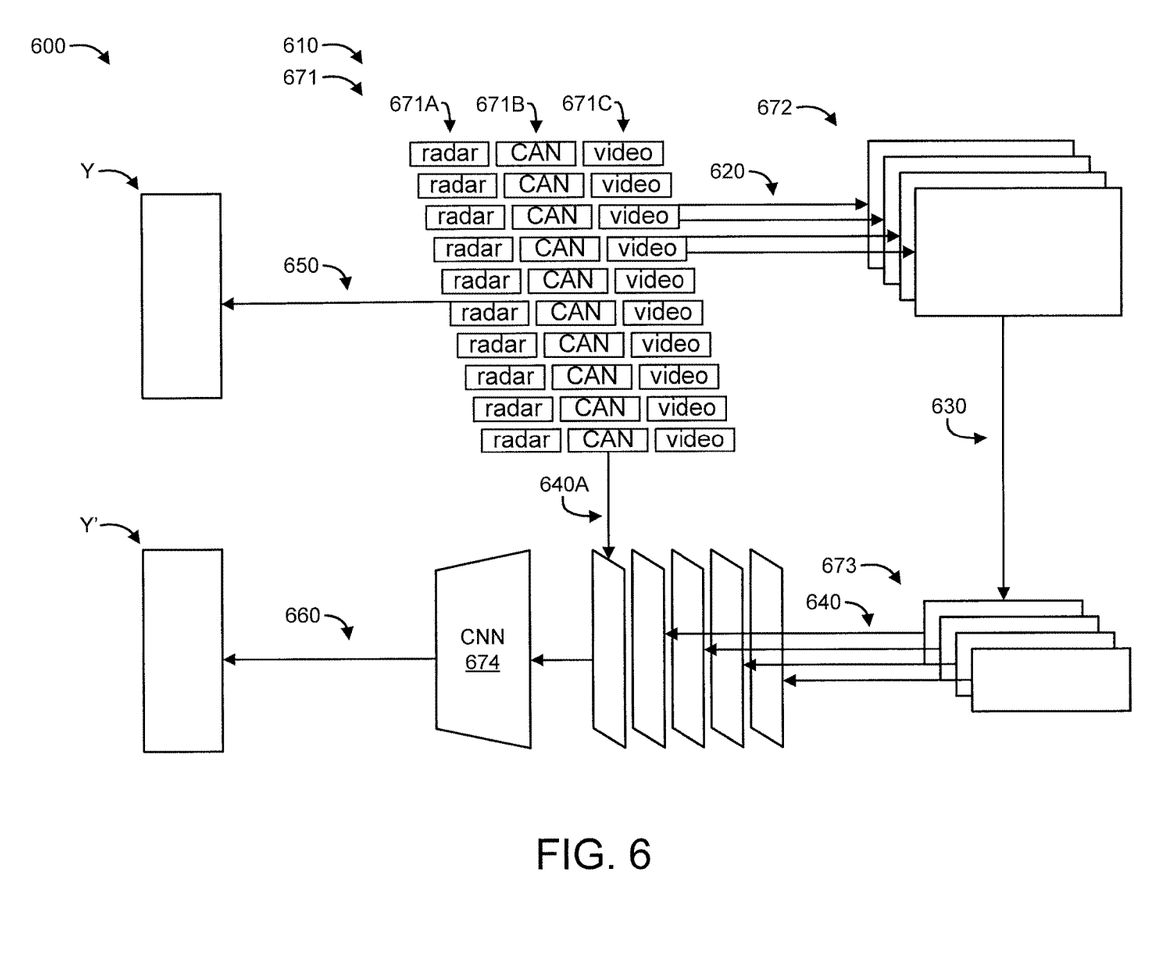
FIG. 6 shows an exemplary method for training the system of FIG. 5, in accordance with an embodiment of the present invention.
Figure 8:
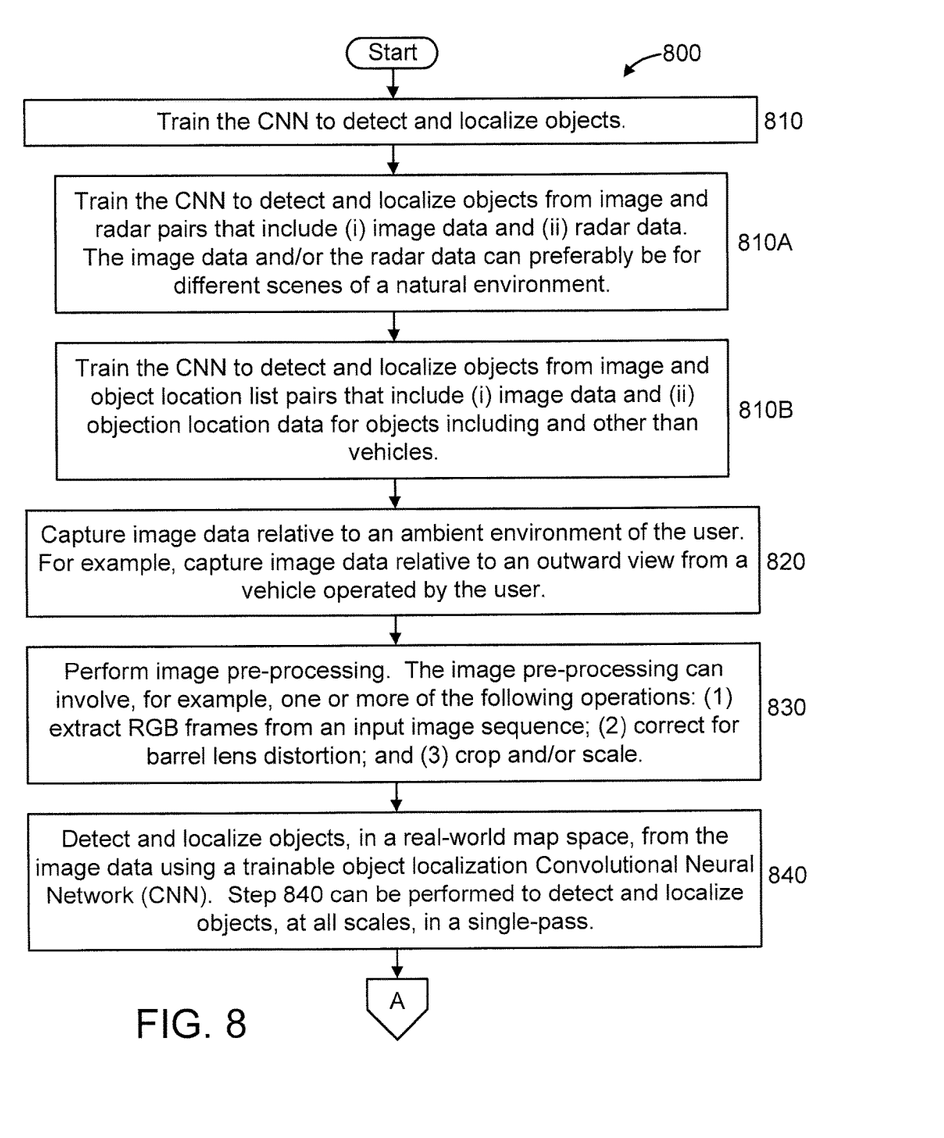
FIG. 8-10 show an exemplary method for assisted driving, in accordance with an embodiment of the present invention.
Figure 9:
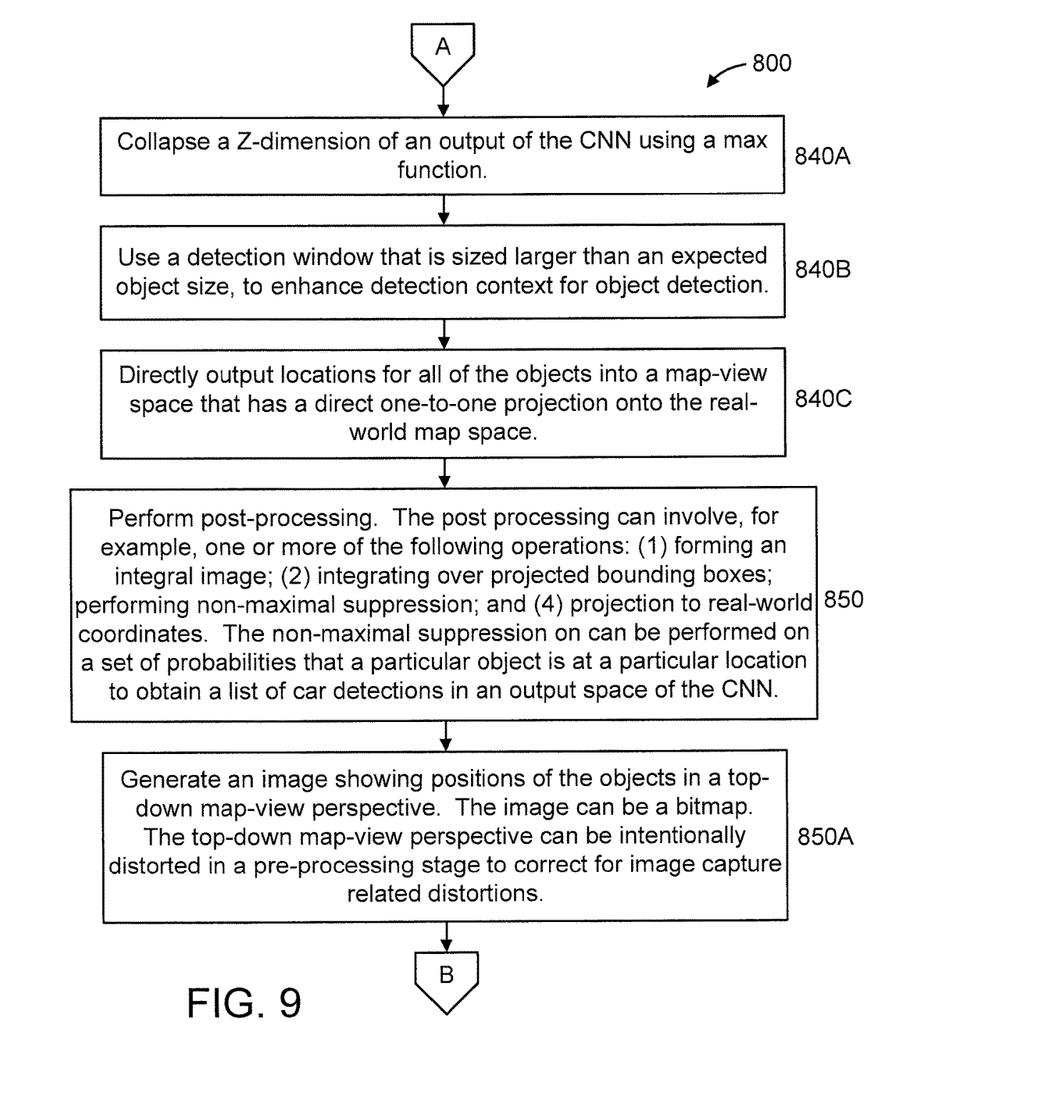
Figure 10:
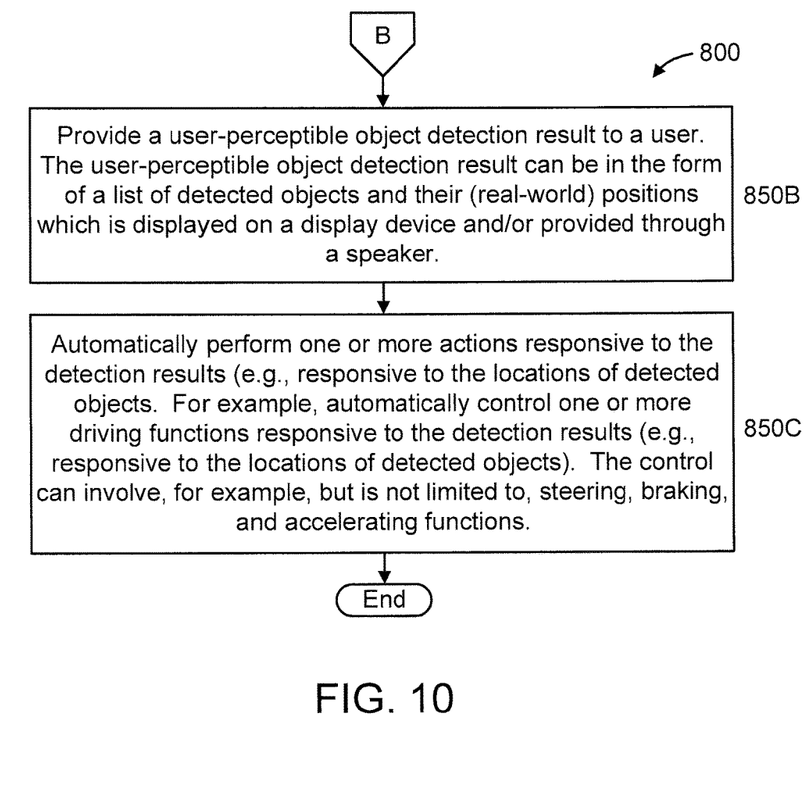

Further, it is to be appreciated that processing system 400 may perform at least part of the method described herein including, for example, at least part of method 600 of FIG. 6 and/or at least part of method 800 of FIGS. 8-10. Similarly, part or all of system 500 may be used to perform at least part of method 600 of FIG. 6 and/or at least part of method 800 of FIGS. 8-10.

FIG. 5 shows an exemplary system 500 for object tracking, in accordance with an embodiment of the present invention. System 500 is also referred to herein as "object detection and locating system" 500.

The system 500 includes a camera 510 and a processor 511.

The system 500 can receive one or more images from the camera 510 (or some other source), and processes the images using the processor 511 to output a list of object (e.g., car, person, pole, tree, garbage can, etc.) positions 512. As used herein, the term "video" can correspond to two or more of the images (which can be used to show motion of object relative to each of the frames).

The system 500 can include a radar system 501 for generating radar data. In another embodiment, the system can omit the radar system 501, and obtain the radar data from an external source. For example, in an embodiment, the system 500 can access one or more remote radar systems and/or remote repositories of radar data.

The images from the camera 510 and the radar data from the radar system 501 can be used to form and/or otherwise derive image and radar pairs that can be processed by the processor 511 to train the CNN.

The processor 511 performs processing including image preprocessing 520, Convolutional Neural Network (CNN) processing (also referred to as "CNN" in short) 521, and post-processing 522. In an embodiment, the processor 511 is capable of interfacing with systems of an emergency motor vehicle in order to control the functioning of such systems, for example, as described in further detail with respect to method 500.

In an embodiment, the image preprocessing 520 can involve, for example, extracting 530 N (where N is an integer, e.g., but not limited to, 3) RGB frames from the video input, correcting 531 for barrel distortion (the "fisheye" lens effect one gets from a wide angle camera lens such as those that are installed in cars), and cropping and/or scaling 532 the images. For example, in an embodiment, the lower region of an images is cropped, which is where the road ahead and the cars are (thus, cutting off the sky).

In an embodiment, the post-processing 522 processes the output of the CNN 521. In traditional work with CNNs and object recognition, one pixel in the output image of the CNN corresponds to a single possible detection of an object in the input image. It is therefore typical to use Non-maximal suppression directly on the output image pixels to cull detections with overlapping corresponding input windows so that only a set of non-overlapping "maximal" detections remain, and those are reported.

In an embodiment, individual object detections are composed of a "filled rectangle" of pixels. For any given position of a car in real-world coordinates, there exists a corresponding rectangle in the (distorted) output space of the CNN 521. These rectangles are also different sizes in the output space of the CNN 521 according to how distant the car is. In order to detect a car, the output of the CNN 521 should have high output values covering the area of a proposed rectangle, that is, the output of the CNN 521 should "paint" the car as a rectangle of appropriate size at the appropriate location in the output.

In order to efficiently calculate the probabilities of cars at all possible locations we first calculate the coverage of all bounding boxes centered on pixel positions in the output space. To do this, we first calculate the "integral image" 540 of the output of the CNN 521. This allows us to efficiently calculate 541 the sum of all pixels in each of the possible bounding boxes, which can then be divided by the area of the bounding box to give a probability of a car in that location. We can then apply the traditional non-maximal suppression 542 to these probabilities in order to achieve a list of car detections in the output space of the CNN 521.

Once we have a list of car detections in the output space of the CNN 521, we can transform this to real world space using the inverse of the transform used for the radar data during training to obtain a projection 543 to real world coordinates. This list can then be used by the operator of the motor vehicle or by the motor vehicle itself in order to, e.g., take actions to avoid a collision and/or so forth.

FIG. 6 shows an exemplary method 600 for training the system 500 of FIG. 5, in accordance with an embodiment of the present invention.

At step 610, input video and radar pairs 671 corresponding to driving trips. In an embodiment, the system 500 is trained with approximately 660 video and radar pairs corresponding to driving trips. In an embodiment, the video and radar pairs 671 can include video 671B taken from inside the subject car and radar 671A which is recorded from a device attached to the front bumper of the car.

At step 620, extract N sequential video image frames 672 from the dataset at random.

At step 630, preprocess the N sequential video image frames 672 to obtain N preprocessed sequential video image frames 673.

At step 640, input the N preprocessed sequential video frames 673 to the modified CNN 674.

In an embodiment, step 640 can include step 640A.

At step 640A, input the subject car's velocity 671C from the CAN (Car Area Network) data for that frame. Step 640A can be performed, for example, when velocities are to be estimated for the cars in the scene.

At step 650, extract the radar data 671A from the dataset corresponding to the last image frame and create a target label image "Y" for the CNN 674 to produce from the radar data.

At step 660, train the neural network by back-propagation to match its output Y' with the target image Y.

Figure 7:
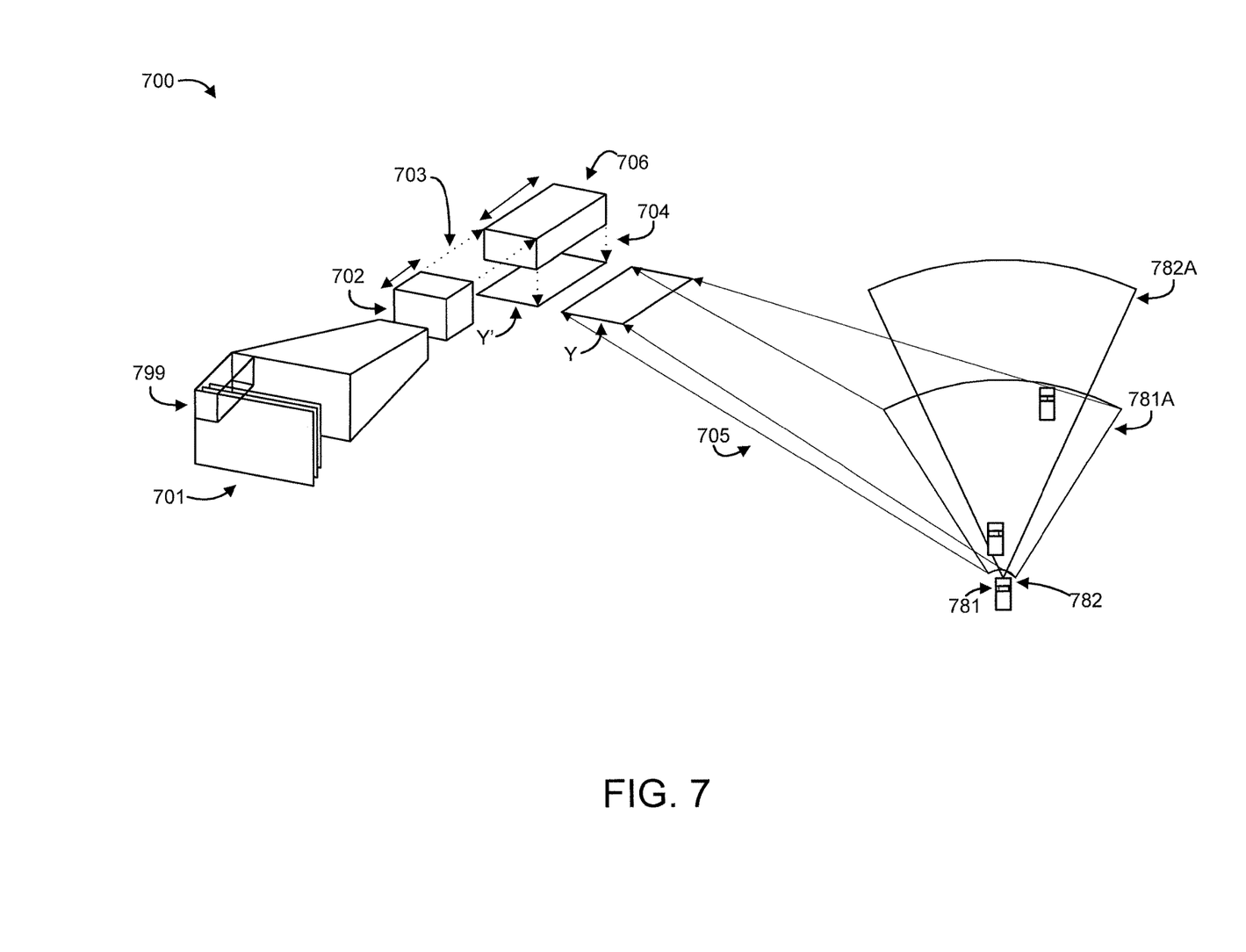
FIG. 7 shows an exemplary Convolutional Neural Network (CNN), in accordance with an embodiment of the present invention.

FIG. 7 shows an exemplary Convolutional Neural Network (CNN) 700, in accordance with an embodiment of the present invention.

The CNN 700 can be, for example, CNN 521 of FIG. 5.

The description of CNN 700 is made relative to a camera 781 and a radar device 782. The camera 781 has a video Field of View (FOV) 781A, and the radar device 782 has a radar FOV 782A.

The CNN 700 includes an input 701 and "N" feature planes 702. The input 701 can include N×RGB image frames. In an embodiment, 3 image frames are used that span approximately 0.5 seconds. Of course, other numbers of image frames, involving different spans, can also be used, while maintaining the spirit of the present invention. Moreover, CAN data can be input in the case when output velocities are to be estimated/used.

In an embodiment, components 701 and 702 can be traditional CNN components. However, a traditional CNN would output class predictions corresponding to every window position at the input (an example window position is the square 799 shown on the input image in FIG. 7 by using the N features for each window position at the "N" feature planes 702 to output "M" probabilities (for example) of the class of detected object being framed by the input window. In contrast, the present invention takes the "N" features for every input window and trains "N×M" 1×1 kernels 703 to map those features into a "depth ray", a vector of length "max depth" 706. Each such column in the output of the CNN 700 at this point 706 corresponds to a ray in space from the camera origin through the center of the CNN window in the input image. Stated another way, it can be said that the present invention uses 1×1 kernels to map from "N" traditional CNN feature planes to "Max Depth" output planes.

A MAX operation 704 is used to completely remove the Z dimension in the output of the CNN 700. This leaves us with a 2 dimensional output in the top-down (or map-view) perspective.

The input data from real-world coordinates is projected (and distorted) 705 into the output space of the CNN 700. Objects are "painted" in this distorted space to reflect the positions and dimensions of the cars. In an embodiment, the distance from the base of the view cone is converted to a distance on a log scale to map a range of approximately 0 to 150 meters to a range from 0 to 45 pixels (max depth) in the output. Of course, other distances, numbers of pixels, and so forth can also be used, while maintaining the spirit of the present invention. This log scale conversion is to give more focus to learning to predict the position of cars nearer the camera. The width of the object is used to determine the dimensions of the painted object in the output space at the projected location. In this way, the "painted" size of an object in the output space of the CNN changes as it moves from close to the subject car (large) to the distance (small).

FIGS. 8-10 show an exemplary method 800, in accordance with an embodiment of the present invention.

In an embodiment, step 810 corresponds to a training stage and steps 820-850 correspond to an inference stage. Further detail regarding the training stage is described relative to FIG. 6.

At step 810, train the CNN to detect and localize objects.

In an embodiment, step 810 can include one or more of steps 810A and 810B.

At step 810A, train the CNN to detect and localize objects from image and radar pairs that include (i) image data and (ii) radar data. In an embodiment, the image data and/or the radar data can preferably be for different scenes of a natural environment. In an embodiment, the image data and/or radar data can preferably be for different driving scenes of a natural driving environment.

At step 810B, train the CNN to detect and localize objects from image and object location list pairs that include (i) image data and (ii) objection location data for objects including and other than vehicles.

At step 820, capture image data relative to an ambient environment of the user. For example, capture image data relative to an outward view from a vehicle operated by the user.

At step 830, perform image pre-processing. The image pre-processing can involve, for example, one or more of the following operations: (1) extract RGB frames from an input image sequence; (2) correct for barrel lens distortion; and (3) crop and/or scale.

At step 840, detect and localize objects, in a real-world map space, from the image data using a trainable object localization Convolutional Neural Network (CNN). In an embodiment, step 840 can be performed to detect and localize objects, at all scales, in a single-pass.

In an embodiment, step 840 can include one or more of steps 840A, 840B, and 840C. Other aspects of the operation of the CNN are shown relative to FIG. 7.

At step 840A, collapse a Z-dimension of an output of the CNN using a max function.

At step 840B, use a detection window that is sized smaller than an expected object (e.g., vehicle, pedestrian, etc.) size, to enhance detection context for object detection.

At step 840C, directly output locations for all of the objects into a map-view space that has a direct one-to-one projection onto the real-world map space.

At step 850, perform post-processing. The post processing can involve, for example, one or more of the following operations: (1) forming an integral image; (2) integrating over projected bounding boxes; performing non-maximal suppression; and (4) projection to real-world coordinates. In an embodiment, the non-maximal suppression on can be performed on a set of probabilities that a particular object is at a particular location in order to obtain a list of car detections in an output space of the CNN.

In an embodiment, step 850 can include one or more of steps 850A-850C.

At step 850A, generate an image showing positions of the objects in a top-down map-view perspective. In an embodiment, the image can be a bitmap. In an embodiment, the top-down map-view perspective can be intentionally distorted in a pre-processing stage to correct for image capture related distortions.

At step 850B, provide a user-perceptible object detection result to a user. The user-perceptible object detection result can be in the form of a list of detected objects and their (real-world) positions which is displayed and/or provided through a speaker. Moreover, the user-perceptible object detection result can be in the form of one or more recommendations to the vehicle operator (e.g., brake now, brake hard, steer right, accelerate, etc.). Hence, as can be envisioned by one of ordinary skill in the art, such recommendation can be directed to avoiding objects in a path of the motor vehicle (such as, e.g., an emergency vehicle or a non-emergency vehicle), where such objects can be inanimate or animate objects.

At step 850C, automatically perform one or more actions responsive to the detection results (e.g., responsive to the locations of detected objects. For example, automatically control one or more driving functions responsive to the detection results. For example, in an embodiment, the present invention is integrated with and/or otherwise coupled to an Advanced Driver-Assistance System (ADAS). The ADAS could apply a decision making process to, e.g., a list of object positions determined by step 850B, in order to determine whether a dangerous condition(s) exists or not (with respect to the motor vehicle) and to further determine a proper corrective action to take to avoid or at least mitigate any potential harm that can result from the dangerous condition. The decision making process can be any known type of decision making process including, but not limited to, preprogrammed rules, a neural network, a decision tree, and so forth. For example, the CNN described herein could be further used for this purpose. It is to be appreciated that the preceding decision making processes are merely illustrative and, thus, other decision making processes can also be used in accordance with the teachings of the present invention, while maintaining the spirit of the present invention.

The control that can be imposed by step 850C can involve, for example, but is not limited to, steering, braking, and accelerating functions. For example, responsive the location of a detected object directly in the path of the motor vehicle, the processor may initiate a control signal to the braking system to apply the brakes in order to avoid hitting the object with the motor vehicle. In another embodiment, when safe, the vehicle can be automatically steered by the processor initiating a control signal to the steering system. These and other implementations are readily determined by one of ordinary skill in the art, given the teachings of the present invention provided herein, while maintaining the spirit of the present invention.

A description will now be given of some of the myriad of competitive/commercial values/advantages of the present invention.

For example, object detection performed directly on video as per the present invention is cheaper than systems involving several sensors such as LIDAR and RADAR.

Also, approaches involving LIDAR and/or RADAR acquire depth information on a per pixel basis in the space of an input image and not in real, world x,y map space.

Moreover, the present invention provides significantly faster detection of objects at multiple scales than prior art approaches. This is because prior art approaches using video that include CNNs are typically trained to recognize an object at a particular scale in image space, usually such that the object fills the frame of the input window to the CNN.

Hence, it is common practice in the prior art to scale the input image to many different scales and scan the CNN over each scale of the input image, thus having to perform object detecting at each of the scales, resulting in N output maps that represent the object detections per pixel at each of the N scales (noting that these are scales, and not real world coordinates as per the present invention).

Hence, the present invention advantageously uses direct training and runtime output of real world positions for objects (not positions in image space as per the prior art).

Additionally, the present invention does not require human data labelling. Video and radar labels are acquired by just "driving around".

Further, the present invention can use a dataset that is a large natural driving dataset that includes many real-life scenarios.

Also, identification, by the present invention, of distant cars in an image is enhanced because the detection window is much larger than the car. That is, the window takes in more context (a small black dot on the road ahead in the distance is likely to be a car) that simply the expected car. As a further example, a significant black dot in the middle of the input window is likely to be a car if it surrounded by road features that would place the dot in the middle of a lane.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   an image capture device configured to capture image data relative to an ambient environment of a user; and
   a processor configured to detect and localize objects, in a real-world map space, from the image data using a trainable object localization Convolutional Neural Network (CNN),
   wherein the CNN is trained to detect and localize the objects from image and radar pairs that include the image data and radar data for different scenes of a natural environment, and
   wherein the processor is further configured to perform a user-perceptible action responsive to a detection and a localization of an object in an intended path of the user,
   wherein the processor is further configured to generate an image showing positions of the objects in a top-down map-view perspective, and wherein the top-down map-view perspective is intentionally distorted in a pre-processing stage to correct for image capture related distortions.

2. The system of claim 1, wherein the processor is configured to train the CNN to detect and localize the objects also from image and object location list pairs that include (i) the image data or other image data and (ii) objection location data for the objects or other objects.

3. The system of claim 1, wherein the image showing the positions of the objects is a bitmap image.

4. The system of claim 1, wherein the processor is configured to use a detection window that is sized larger than an expected target object size, to enhance a detection context for object detection.

5. The system of claim 1, wherein the processor is configured to perform post-processing on the image to produce a discrete list of object detections and corresponding object positions in real world space.

6. The system of claim 1, wherein the processor is configured to use a decision making process to evaluate a scene as potentially dangerous such that the processor provides a user-perceptible object detection result indicative of a potentially dangerous scene.

7. The system of claim 1, wherein the system is comprised in an advanced driver-assistance system that uses a decision making process to evaluate a scene as potentially dangerous such that the processor automatically takes control over one or more systems of the motor vehicle to mitigate any potential harm.

8. The system of claim 1, wherein the processor is configured to directly output locations for all of the objects into a map-view space that has a direct one-to-one projection onto the real-world map space.

9. The system of claim 1, wherein the processor is configured to also detect and localize the objects, at all scales, in a single-pass.

10. The system of claim 1, wherein the processor is configured to perform non-maximal suppression on a set of probabilities that a particular object is at a particular location to obtain a list of object detections in an output space of the CNN.

11. The system of claim 1, wherein a last layer in the CNN collapses a Z-dimension of an output of the CNN using a max function to provide an output of the CNN only in X- and Y-dimensions.

12. The system of claim 1, wherein the processor detects and localizes the objects using the CNN by (i) inputting N features for each of input windows applied to the image data, and (ii) mapping the N features into a vector having a constrained length using 1×1 kernels, wherein N is an integer.

13. A computer-implemented method, comprising:
   capturing, by an image capture device, image data relative to an ambient environment of a user;
   detecting and localizing, by a processor, objects, in a real-world map space, from the image data using a trainable object localization Convolutional Neural Network (CNN); and
   providing, by the processor, performing a user-perceptible action responsive to a detection and a localization of an object in an intended path of the user,
   wherein the CNN is trained to detect and localize the objects from image and radar pairs that include the image data and radar data for different scenes of a natural environment,
   wherein the processor is further configured to generate an image showing positions of the objects in a top-down map-view perspective, and wherein the top-down map-view perspective is intentionally distorted in a pre-processing stage to correct for image capture related distortions.

14. The computer-implemented method of claim 13, wherein the CNN is trained to detect and localize the objects also from image and object location list pairs that include (i) the image data or other image data and (ii) objection location data for objects including and other than vehicles.

15. The computer-implemented method of claim 13, further comprising performing post-processing on the image to produce a discrete list of object detections and corresponding object positions in real world space.

16. The computer-implemented method of claim 13, wherein said detecting and localizing step detects and localizes the objects, at all scales, in a single-pass.

17. A computer program product, the computer program product comprising a non-transitory computer readable storage medium having program instructions embodied therewith, the program instructions executable by a computer to cause the computer to perform a method comprising:
   capturing, by an image capture device, image data relative to an ambient environment of a user;
   detecting and localizing, by a processor, objects, in a real-world map space, from the image data using a trainable object localization Convolutional Neural Network (CNN); and
   providing, by the processor, performing a user-perceptible action responsive to a detection and a localization of an object in an intended path of the user,
   wherein the CNN is trained to detect and localize the objects from image and radar pairs that include the image data and radar data for different scenes of a natural environment,
   wherein the processor is further configured to generate an image showing positions of the objects in a top-down map-view perspective, and wherein the top-down map-view perspective is intentionally distorted in a pre-processing stage to correct for image capture related distortions.

* * * * *